US00RE40313E

(19) United States
(12) Reissued Patent
Axler et al.

(10) Patent Number: US RE40,313 E
(45) Date of Reissued Patent: May 13, 2008

(54) PILOTING CONFIGURATION FOR THRUST BEARING ASSEMBLY

(75) Inventors: Edward C. Axler, Bloomfield, CT (US); Edward P. Butler III, Torrington, CT (US)

(73) Assignee: Timken US Corporation, Torrington, CT (US)

(21) Appl. No.: 11/656,355
(22) PCT Filed: Jan. 31, 2003
(86) PCT No.: PCT/US03/02885
§ 371 (c)(1),
(2), (4) Date: Oct. 28, 2004
(87) PCT Pub. No.: WO03/067107
PCT Pub. Date: Aug. 14, 2003

Related U.S. Patent Documents

Reissue of:
(64) Patent No.: 7,073,951
Issued: Jul. 11, 2006
Appl. No.: 10/512,896
Filed: Oct. 28, 2004

U.S. Applications:
(60) Provisional application No. 60/353,467, filed on Feb. 1, 2002.

(51) Int. Cl.
*F16C 33/58* (2006.01)

(52) U.S. Cl. ..... 384/620; 384/622
(58) Field of Classification Search ..... 384/618–623
See application file for complete search history.

(56) References Cited

U.S. PATENT DOCUMENTS

| | | | | |
|---|---|---|---|---|
| 3,981,549 | A | 9/1976 | Carullo | |
| 3,999,816 | A | 12/1976 | Pitner | 384/620 |
| 3,999,817 | A | 12/1976 | Bhateja et al. | |
| 4,733,979 | A | 3/1988 | Tsuruki | 384/620 |

FOREIGN PATENT DOCUMENTS

| | | |
|---|---|---|
| DE | 7139172 | 1/1972 |
| DE | 40 40 414 | 7/1992 |
| DE | 197 11 389 | 9/1998 |
| FR | 1.249.807 | 1/1961 |

*Primary Examiner*—Thomas R. Hannon
(74) *Attorney, Agent, or Firm*—Michael Best & Friedrich LLP

(57) ABSTRACT

A thrust bearing assembly comprising first and second thrust race members (52, 60) and a roller assembly (22) positioned therebetween. The first thrust race member (52) includes a radial race surface (53), a flange extending from the race surface and a radial lip (54) extending radially beyond the flange (56). The second thrust race member (60) includes a radial race surface (61) and a piloting flange extending from the race surface and includes a retaining lip (64). The second thrust member (60) is positioned within the first thrust member (52) radial lip (54) and retained thereby and there is a clearance between the retaining lip (54) and the first thrust race member flange (56) external surface.

20 Claims, 2 Drawing Sheets

FIG. 1
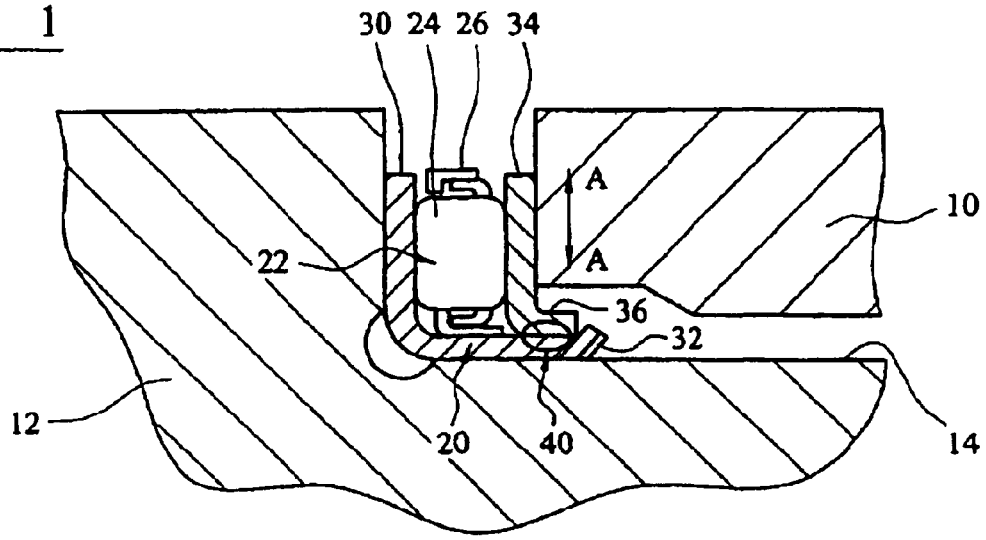
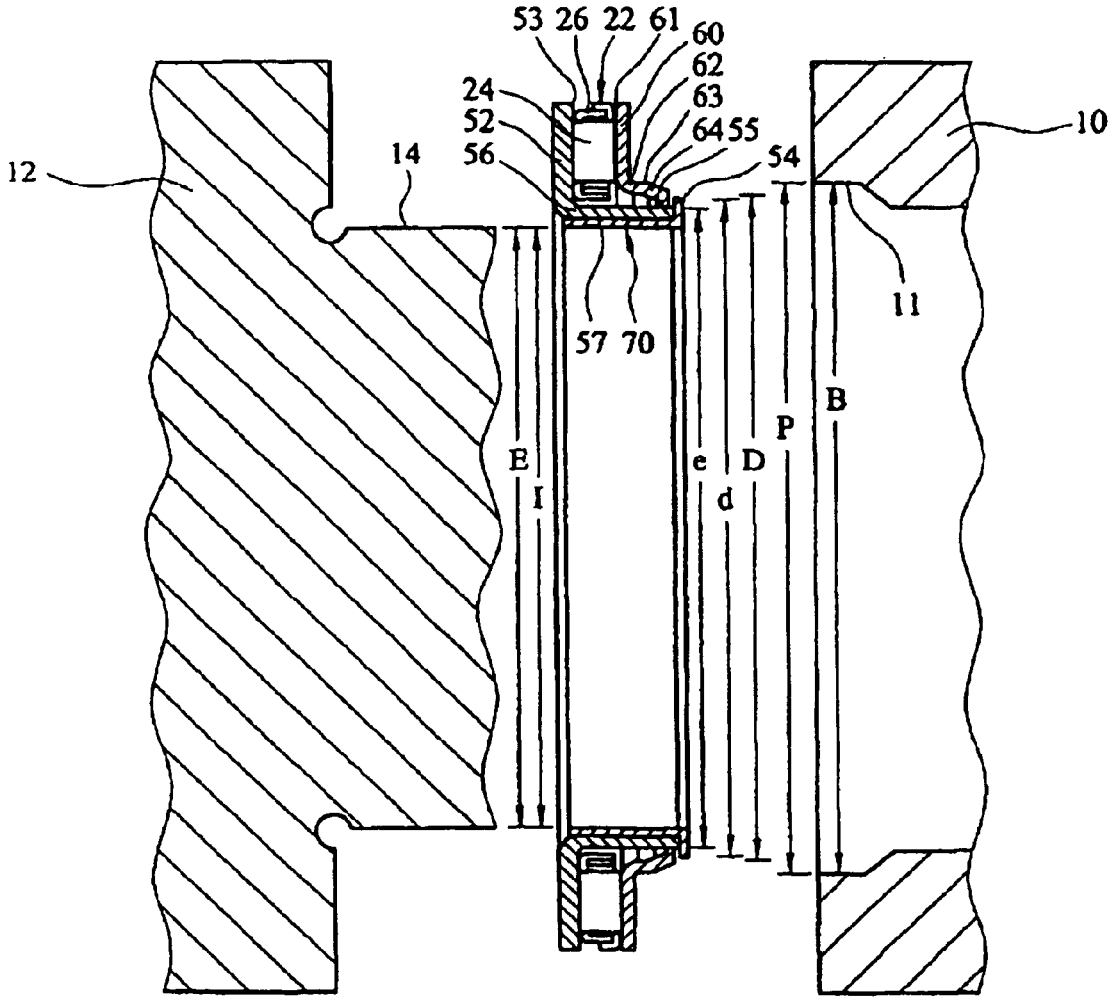
FIG. 2

PILOTING CONFIGURATION FOR THRUST BEARING ASSEMBLY

Matter enclosed in heavy brackets [ ] appears in the original patent but forms no part of this reissue specification; matter printed in italics indicates the additions made by reissue.

*CROSS-REFERENCE TO RELATED APPLICATIONS*

*This application is a 35 U.S.C. § 371 national phase application of International Patent Application PCT/US03/02885, filed Jan. 31, 2003, which claimed the benefit of U.S. Provisional Patent Application No. 60/353,467, filed Feb. 1, 2002.*

BACKGROUND

Referring to FIG. 1, many applications utilize a thrust bearing assembly at the interface between two adjacent components 10 and 12 with relative rotation between the components. The illustrated application includes adjacent planetary gears 10 and 12, but other assemblies, for example, a shaft and a housing, may also utilize such a thrust bearing assembly. A prior art thrust bearing assembly 20 is illustrated in FIG. 1.

The bearing assembly 20 generally includes a roller assembly 22 (shown in this example as rollers 24 maintained within a cage 26), positioned between first and second races 30 and 34. The first race includes an outer curl 32 to retain the bearing assembly 20 in an assembled condition prior to installation in the desired application.

Once installed, the first race 30 is radially piloted against the surface 14 of the gear 12. The second race 34 must also be radially piloted to prevent undesired radial movement as indicated by the arrows A-A in FIG. 1. The second race 34 includes a lip portion 36 that pilots against the first race 30. However, rotation of the gear 10 causes relative movement between the first and second races 30 and 34. Over time, such relative movement causes wear at the piloting junction 40 between the two races 30 and 34 with a resultant undesirable groove (not shown). Additionally, worn material debris causes detrimental contamination to the bearing rolling elements.

SUMMARY

The present invention relates to a thrust bearing assembly comprising first and second thrust race members and a roller assembly positioned therebetween. The first thrust race member includes a radial race surface, a flange extending from the race surface and having an external surface having a diameter e, and a radial lip extending radially beyond the flange, the radial lip having a maximum diameter D that is greater than the diameter e. The roller assembly is positioned about the first thrust race member flange external surface within the first thrust member radial lip. The second thrust race member includes a radial race surface and a piloting flange extending from the race surface and includes a retaining lip. The retaining lip has a minimum diameter d that is less than the maximum diameter D and greater than the diameter e such that the second thrust member is positioned within the first thrust member radial lip and retained thereby and there is a clearance between the retaining lip and the first thrust race member flange external surface.

BRIEF DESCRIPTION OF THE DRAWINGS

FIG. 1 is a partial cross sectional view of a prior art thrust bearing assembly positioned relative to a pair of planetary gear suns.

FIG. 2 is a cross sectional view of a thrust bearing assembly in accordance with a first embodiment of the present invention prior to engagement with the back up members.

DETAILED DESCRIPTION OF THE PREFERRED EMBODIMENTS

Figure 3:
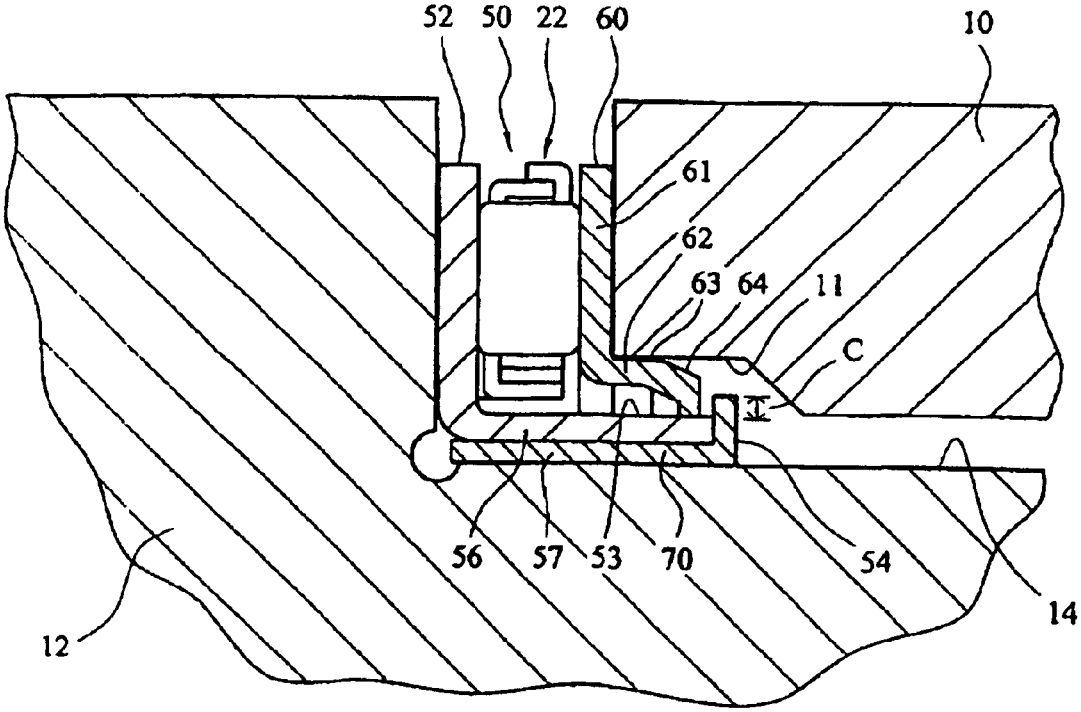
FIG. 3 is a partial cross sectional view of the thrust bearing assembly of FIG. 2 engaged with a pair of back up members.

The present invention will be described with reference to the accompanying drawing figures wherein like numbers represent like elements throughout. Certain terminology, for example, "top", "bottom", "right", "left", "front", "frontward", "forward", "back", "rear", "rearward", is used in the following description for relative descriptive clarity only and is not intended to be limiting. The term "internal" is used herein to describe a relative position toward the centerline of the bearing assembly or a respective back up member and the term "external" is used herein to describe a relative position away from the centerline of the bearing assembly or a respective back up member.

Referring to FIG. 2, a first embodiment of the invention is shown prior to engagement with the desired application. The assembly 50 includes a roller assembly 22 positioned between first and second race members 52 and 60. The assembly 50 is configured to be used with various back up members 10 and 12 configured to rotate relative to one another. One of the back up members 10 has an internal surface 11 having a diameter B. The other back up member 12 has an external surface 14 having a diameter E. An exemplary application is use in conjunction with a long sun (12) and a short sun (10) of a planetary gear set. Another example is a shaft (12) extending within a housing (10).

The roller assembly 22 preferably includes a plurality of rollers or needles 24 supported in a cage assembly 26. In the illustrated embodiment, the cage assembly 26 has a two piece configuration, but other configurations, for example, a Z-configuration, or no cage, can also be utilized. The rollers or needles 24 are positioned between the first and second thrust race members 52 and 60 against opposed radial race surfaces 53 and 61, respectively.

Referring to FIGS. 2 and 3, the first thrust race member 52 includes a radial flange 56 extending from the race surface 53 toward and beyond the rollers 24. The flange 56 preferably extends perpendicular to the race surface 53, but may be otherwise oriented. The flange 56 has an internal surface 57 having an internal diameter i that is approximately equal to the back up member 12 external surface 14 diameter E such that the internal surface 57 pilots on the external surface 14 of the back up member 12. In the present embodiment, the internal surface 57 is defined by a cup 70, the function of which will be described hereinafter, positioned about the race member 52. The flange 56 has an external surface 55 configured to support the race assembly 22. The external surface 55 has an external diameter e.

A lip 54 extends beyond the first race member flange 56. The lip 54 of the present embodiment is formed by a portion of the drawn cup 70. The cup 70 may be drawn in various configurations, with the lip 54 extending at various angles, preferably at an angle between 45 degrees and 90 degrees. The lip 54 may be a continuous surface or it may be a series of spaced apart tabs or the like. The first race lip 54 has a maximum diameter D that is greater than the external surface 55 external diameter e.

The second race member 60 includes a race surface 61 and a piloting flange 62 extending substantially perpendicular thereto. The piloting flange 62 has an external piloting surface 63 having a diameter P that is substantially equal to the back up member 10 internal surface 11 diameter B. As such, the piloting surface 63 engages and thereby pilots on the internal surface 11 of the back up member 10. The piloting surface 60 may be a continuous surface or it may be a series of spaced apart clips or the like.

A retaining tab 64 preferably extends inwardly from the piloting flange 62. The retaining lip 64 can be provided at various angles and is preferably between 45 and 90 degrees relative to the piloting flange 62, but may be as low as zero degrees such that it extends straight from the flange 62. The retaining lip 64 may be a continuous surface or it may be a series of spaced apart tabs or the like. Referring to FIG. 2, the retaining lip 64 defines a minimum internal diameter d that is less than the first race lip 54 maximum diameter D, but greater than the first race member flange 56 external surface diameter e. As such, the retaining lip 64 contacts the lip 54 to maintain the assembly 50 in an assembled condition prior to installation, however, there is a clearance C between the retaining lip 64 and the external surface 55.

In the present embodiment, the cup 70 is preferably spun onto the first race 52 after the roller assembly 22 and second race 60 are positioned therein such that the lip 54 retains the roller assembly 22 and second race 60'. The thrust races 52 and 60 are preferably manufactured from formed sheet metal, but may be manufactured from other materials. The race surfaces 53, 61 and flanges 55 and 62 are preferably continuous surfaces, but may be provided with apertures, grooves, notches or other passages to provide fluid flow passages or otherwise supplement the bearing performance.

Once installed, as shown in FIG. 3, each race 52, 60 contacts a respective back up member 12, 10 to maintain the races 52, 60 in an operating position. In operation, the clearance C between the lip 64 and the first race member external surface 55 is maintained such that there is no cross-piloting between the two races 52 and 60.

Figure 4:
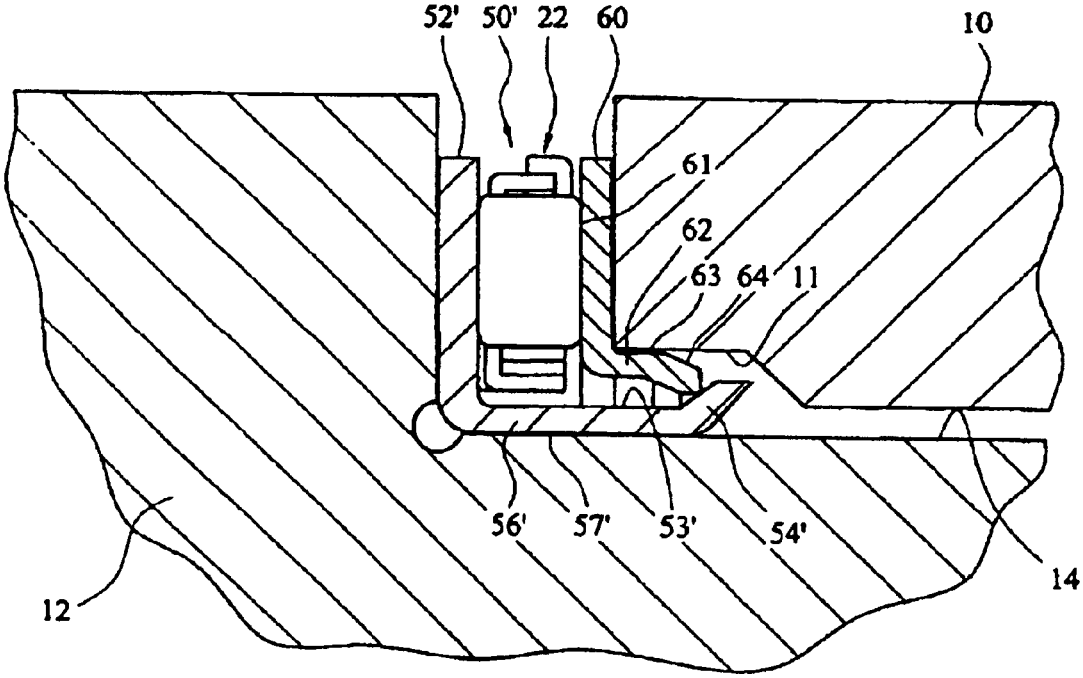
FIG. 4 is a partial cross sectional view of a thrust bearing assembly in accordance with a second embodiment of the present invention engaged with a pair of back up members.

Referring to FIG. 4, an alternative embodiment is illustrated. The bearing assembly 50' is substantially the same as the bearing assembly 50 of the previous embodiment, except that the lip 54' of the first race member 52' is formed as a angled portion of the first race flange 56' such that the cup 70 is not utilized. The surface of the flange 56' defines the internal surface 57'. The second race member 60 may be snapped past the lip 54' or the lip 54' may be formed after the roller assembly 22 and second race 60 are inserted. In other aspects the embodiments are the same, including the clearance between the races 52' and 60 during operation.

What is claimed is:

1. A thrust bearing assembly comprising:

a first thrust race member including a radial race surface, a flange extending from the race surface and having an external surface having a diameter e, and a radial lip extending radially beyond the flange, the radial lip having a maximum diameter D that is greater than the diameter e;

a roller assembly positioned about the first thrust race member flange external surface within the first thrust member radial lip; and a second thrust race member including a radial race surface and a piloting flange extending from the race surface and including a retaining lip, the retaining lip has a minimum diameter d that is less than the maximum diameter D and greater than the diameter e such that the second thrust member is positioned within the first thrust member radial lip and retained thereby and there is a clearance between the retaining lip and the first thrust race member flange external surface.

2. The thrust bearing assembly of claim 1 wherein the first thrust race member flange extends in a first direction past the roller assembly and the second thrust race member piloting flange extends away from the roller assembly in the first direction.

3. The thrust bearing assembly of claim 1 wherein the first thrust race member lip is defined by a drawn cup positioned about the first thrust race member.

4. The thrust bearing assembly of claim 1 wherein the first thrust race member flange includes a bent portion to define the first thrust race member lip.

5. The thrust bearing assembly of claim 1 wherein the first thrust race member lip extends from the first thrust race member flange at an angle between 45 and 90 degrees.

6. The thrust bearing assembly of claim 1 wherein the second thrust race member retaining lip extends from the second thrust race member piloting flange at an angle between 45 and 90 degrees.

7. The thrust bearing assembly of claim 1 wherein the second thrust race member retaining lip extends from the second thrust race member piloting flange at an angle between 0 and 90 degrees.

8. The thrust bearing assembly of claim 1 wherein the second thrust race member piloting flange is defined by a series of spaced apart clips.

9. The thrust bearing assembly of claim 1 wherein the second thrust race member retaining lip is defined by a series of spaced apart tabs.

10. An assembly comprising:

first and second back up members rotatable relative to one another, the first back up member defining an internal surface having a diameter B and the second back up member defining an external surface having a diameter E; and a thrust bearing assembly comprising:

a first thrust race member including a radial race surface, a flange extending from the race surface and having an external surface having a diameter e and an internal surface having a diameter i that is substantially equal to the diameter E, and a radial lip extending radially beyond the flange, the radial lip having a maximum diameter D that is greater than the diameter e;

a roller assembly positioned about the first thrust race member flange external surface within the first thrust member radial lip; and a second thrust race member including a radial race surface and a piloting flange extending from the race surface and having an external surface having a diameter P that is substantially equal to the diameter B, the piloting flange including a retaining lip, the retaining lip having a minimum diameter d that is less than the maximum diameter D and greater than the diameter e such that the second thrust member is positioned within the first thrust member radial lip and retained thereby;

wherein the thrust bearing assembly is positioned between the first and second back up members with the first thrust race member flange internal surface piloting on the second back up member external surface and the second thrust race member piloting flange external surface piloting on the first back up member internal surface such that there is a clearance between the retaining lip and the first thrust race member flange external surface.

11. The assembly of claim 10 wherein the first back up member is a short sun and the second back up member is a long sun of a planetary gear set.

12. The assembly of claim 10 wherein the first back up member is a housing and the second back up member is a shaft.

13. The thrust bearing assembly of claim 10 wherein the first thrust race member flange extends in a first direction past the roller assembly and the second thrust race member piloting flange extends away from the roller assembly in the first direction.

14. The thrust bearing assembly of claim 10 wherein the first thrust race member lip is defined by a drawn cup positioned about the first thrust race member.

15. The thrust bearing assembly of claim 10 wherein the first thrust race member flange includes a bent portion to define the first thrust race member lip.

16. The thrust bearing assembly of claim 10 wherein the first thrust race member lip extends from the first thrust race member flange at an angle between 45 and 90 degrees.

17. The thrust bearing assembly of claim 10 wherein the second thrust race member retaining lip extends from the second thrust race member piloting flange at an angle between 45 and 90 degrees.

18. The thrust bearing assembly of claim 10 wherein the second thrust race member retaining lip extends from the second thrust race member piloting flange at an angle between 0 and 90 degrees.

19. The thrust bearing assembly of claim 10 wherein the second thrust race member piloting flange is defined by a series of spaced apart clips.

20. The thrust bearing assembly of claim 10 wherein the second thrust race member retaining lip is defined by a series of spaced apart tabs.

* * * * *